United States Patent
Kim et al.

(10) Patent No.: US 12,502,677 B2
(45) Date of Patent: Dec. 23, 2025

(54) INTEGRATED SIEVE DEVICE FOR PARTICLE SIZE SCREENING OF SOIL SAMPLES

(71) Applicant: Korea Institute Of Geoscience And Mineral Resources, Daejeon (KR)

(72) Inventors: Yuri Kim, Sejong-si (KR); Jiyoung Choi, Daejeon (KR); Yoonmi Kim, Seoul (KR)

(73) Assignee: Korea Institute Of Geoscience And Mineral Resources, Daejeon (KR)

( * ) Notice: Subject to any disclaimer, the term of this patent is extended or adjusted under 35 U.S.C. 154(b) by 0 days.

(21) Appl. No.: 18/910,393

(22) Filed: Oct. 9, 2024

(65) Prior Publication Data
US 2025/0128266 A1    Apr. 24, 2025

(51) Int. Cl.
*B03B 5/48*    (2006.01)
*G01N 15/02*    (2006.01)

(52) U.S. Cl.
CPC ............ *B03B 5/48* (2013.01); *G01N 15/0272* (2013.01)

(58) Field of Classification Search
CPC ....................................................... B03B 5/48
USPC ....................................................... 209/422
See application file for complete search history.

(56) References Cited

U.S. PATENT DOCUMENTS

| | | | |
|---|---|---|---|
| 9,457,356 B2 | 10/2016 | Cho et al. | |
| 10,071,944 B2 * | 9/2018 | Foley | C07C 45/40 |
| 2016/0121340 A1 | 5/2016 | Cho et al. | |

FOREIGN PATENT DOCUMENTS

| | | | | |
|---|---|---|---|---|
| CN | 203229829 U | * | 10/2013 | |
| CN | 105107707 A | | 12/2015 | |
| CN | 211937785 U | * | 11/2020 | |
| CN | 212596964 U | | 2/2021 | |
| CN | 220969862 U | * | 5/2024 | |
| JP | H03-221159 A | | 9/1991 | |
| JP | 6687547 B2 | * | 4/2020 | ............ C07C 51/34 |
| KR | 10-2007-0007525 A | | 1/2007 | |
| KR | 20070007525 A | * | 1/2007 | ............... B07B 1/55 |
| KR | 100748077 B1 | * | 8/2007 | ............ B07B 13/04 |
| KR | 10-1133429 B | | 4/2012 | |
| KR | 10-1517614 B | | 5/2015 | |

(Continued)

OTHER PUBLICATIONS

Japanese Office Action issued in corresponding Japanese Patent Application No. 2024-176823, dated Aug. 12, 1 2025.

*Primary Examiner* — Terrell H Matthews
(74) *Attorney, Agent, or Firm* — Harness, Dickey & Pierce, P.L.C.

(57) ABSTRACT

An integrated sieve device for particle size screening of a soil sample is provided, the device comprising: a particle size screening unit having at least one sieve and configured to screen the soil sample by particle sizes and to drop the soil sample; a body housing in a cylindrical shape, wherein a part of a lateral surface of the body housing is open, wherein the particle size screening unit is detachably coupled to an inner lateral surface of the body housing; a sample reception unit mounted at a lower portion of the particle size screening unit coupled to the body housing and configured to collect soil and water discharged below the particle size screening unit by being screened by the sieve; and a water supply unit mounted at an inlet formed on an upper end of the body housing and configured to supply water into the particle size screening unit.

9 Claims, 5 Drawing Sheets

(56) References Cited

FOREIGN PATENT DOCUMENTS

| KR | 101517614 B1 * | 5/2015 | ............... B03B 5/16 |
| KR | 10-2016-0004425 A | 1/2016 | |
| KR | 20160004425 A * | 1/2016 | ............... B07B 1/42 |
| KR | 10-2069015 B | 2/2020 | |
| KR | 102069015 B1 * | 2/2020 | ............... B07B 1/28 |

* cited by examiner

[FIG. 1]
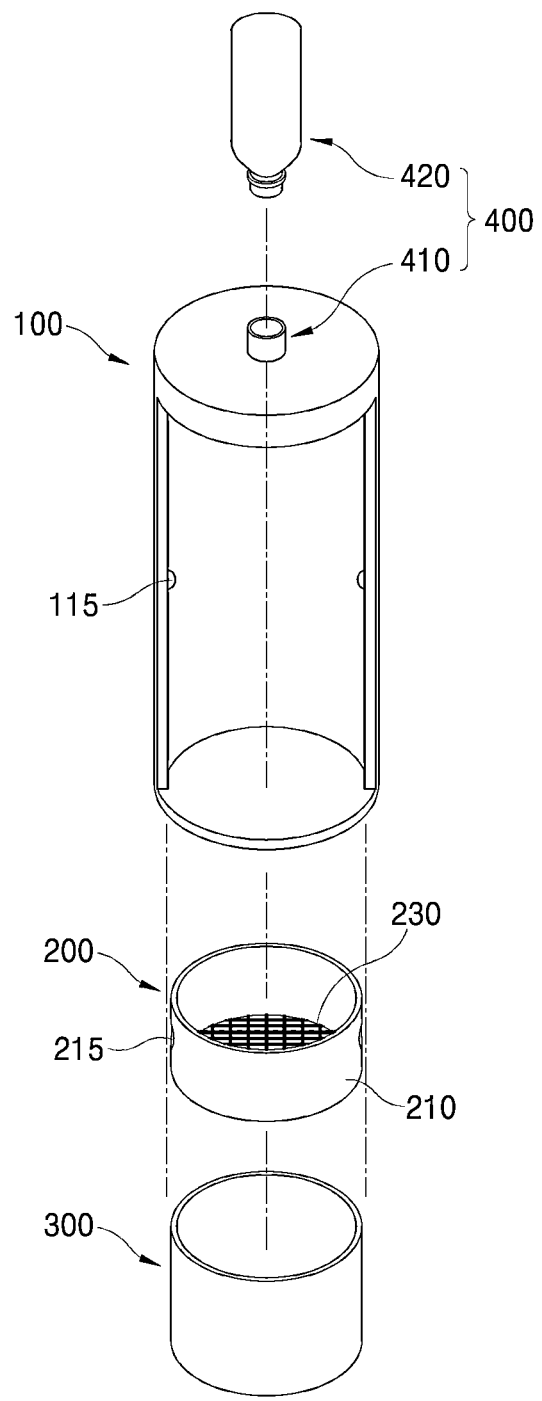

[FIG. 2]
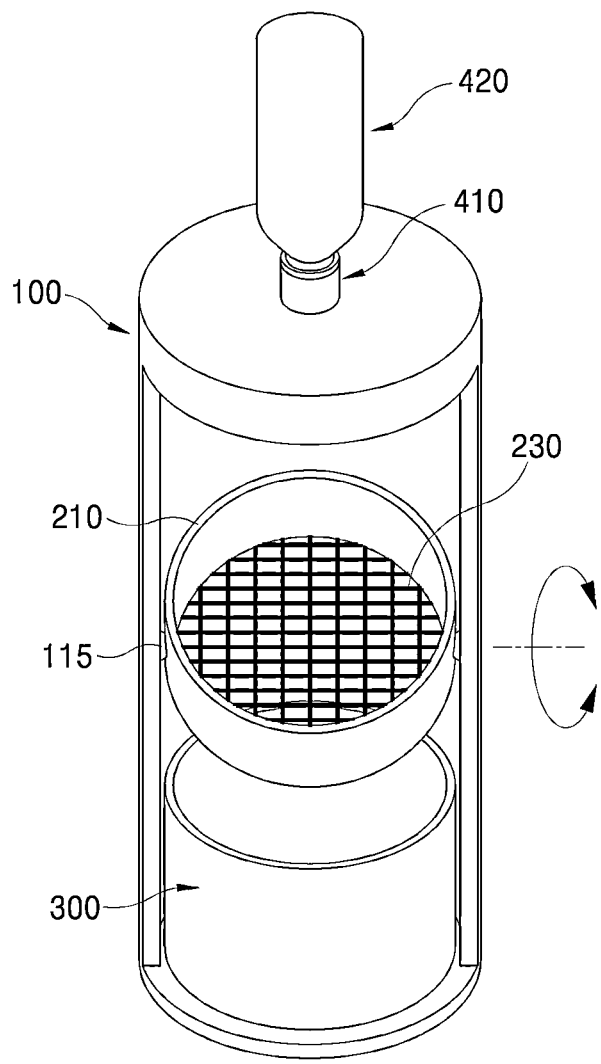

[FIG. 3]
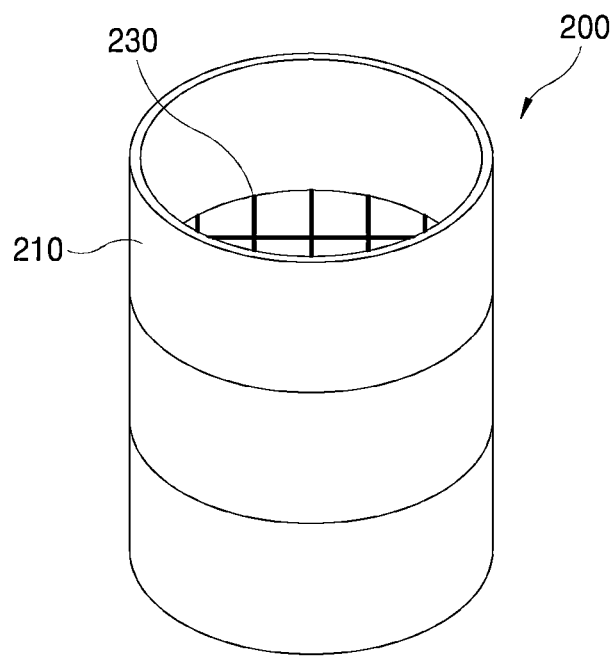

[FIG. 4]
230
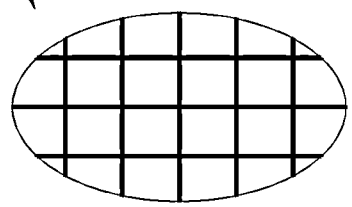
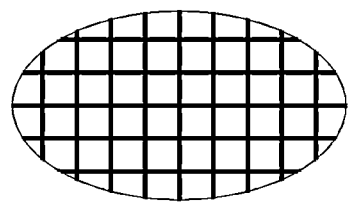
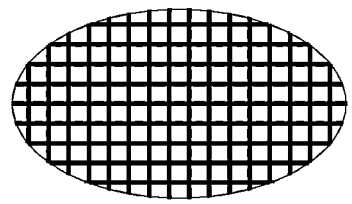

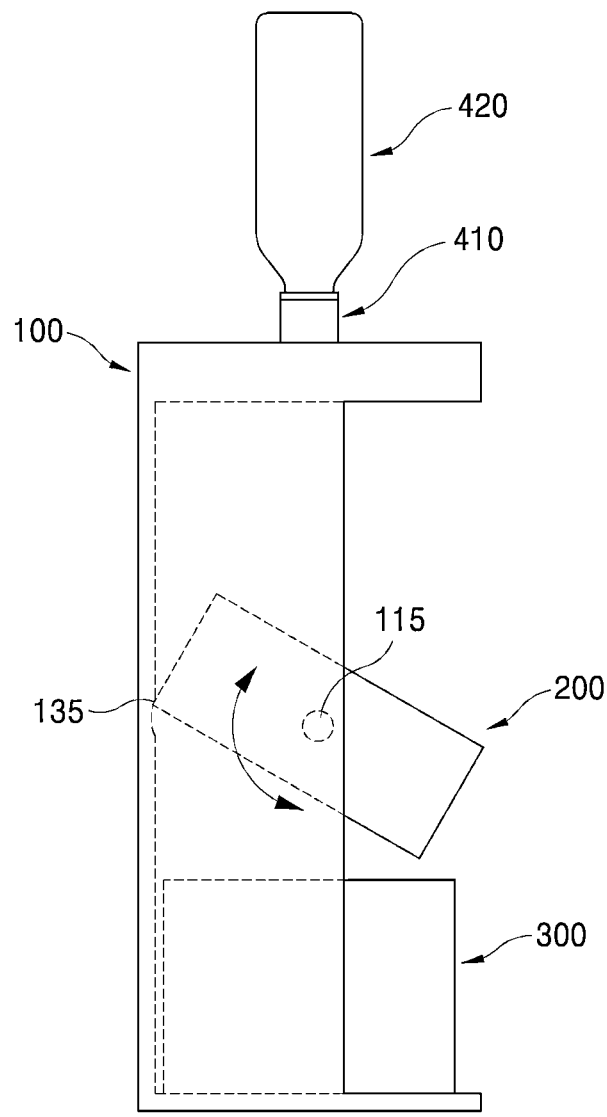
[FIG. 5]

INTEGRATED SIEVE DEVICE FOR PARTICLE SIZE SCREENING OF SOIL SAMPLES

CROSS-REFERENCE TO RELATED APPLICATION

This application claims priority to Korean Patent Application No. 10-2023-0139469 filed on Oct. 18, 2023, and all the benefits accruing therefrom under 35 U.S.C. § 119, the contents of which is incorporated by reference in its entirety.

BACKGROUND OF THE DISCLOSURE

1. Field of the Disclosure

The present disclosure relates to a wet sieve device, and more particularly to an integrated sieve device for particle size screening of soil samples. The integrated sieve device may facilitate particle size screening and collection of soil samples through the process of wet-sieving.

2. Description of the Related Art

Soil particles exhibit different physical and chemical properties depending on their size. For example, chemical reactivity of the soil particles increase as they decrease in size, as well as their mobility increases by mudflow when the soil particles are present with water. Therefore, the soil particles need to be separated by their sizes.

For example, in the process of remediating soil contamination, the optimal remediation method is performed depending on the particle sizes, because the distribution of contamination varies depending on the particle sizes. In addition, river sediments must be analyzed by collecting particles of a certain size, when creating geochemical maps.

To separate soils by particle size, particle size screening devices are generally used. The conventional particle size screening devices are usually large, complex, and motorized, but there have not been developed mobile or portable devices that are suitable for sieving small sample volumes.

Therefore, if some samples need to be sieved without external power, the samples should be screened by being shaken repeatedly using a sieve of a suitable size. However, this process is labor intensive, therefore is difficult to do for long periods of time. In addition, particles of undesirable sizes can be mixed in as impurities because such process is done in an open system.

As mentioned above, there is a need for particle size screening devices that are small and portable for geochemical mapping and for examining samples by traveling to different locations.

The conventional process of wet sieving uses conventional sieves for screening particle sizes separation of soil samples. The diameters of the sieves are 7.5 cm in general, where the grids of the sieves are different in their sizes. Therefore, the user can choose the sieve that has the proper grid size of grid for the desired sediment particle size, and then use the sieve in standalone.

In particular, during the process of wet sieving, a scrubber or a brush should be used to sufficiently loosen the agglomerated sediments. In addition, distilled water should be continuously supplied to the sediments. In this time, the coarse-grained samples remaining on the sieve are then collected for the final sample, while the fine particles passing through the sieve are simply swept away.

Also, in the process of sieving highly cohesive clayey sediments, it is important to use a brush or scrubber to loosen any clumped sediment and to keep the sediment constantly supplied with distilled water.

In this time, the problem lies in that the user has to hold the sieve in one hand and the brush in the other to loosen the sediment, therefore the user can't continuously supply the distilled water from a distilled water bottle. Thus, the user has to put the sieve or the brush down on the ground for a while in order to supply the distilled water, which can lead to contamination or loss of the sample.

In addition, a beaker must be supported under the sieve to recover the coarse-grained samples remaining on the sieve, as well as to recover fine-grained sediment that has passed through the sieve, which can result in a large amount of sediment loss during the sieving process, because the beaker and the sieve are not stationary.

RELATED PATENT DOCUMENT

Patent Document 1: Korean Patent Publication No. 10-2016-0004425 (Jan. 13, 2016)

Patent Document 2: Korean Registered Patent No. 10-1517614 (Apr. 28, 2015)

SUMMARY OF THE DISCLOSURE

The purpose of the present disclosure, which aims to solve the aforementioned conventional problems, is to provide an integrated sieve device for particle size screening of soil samples by connecting the sieve and the collector with each other to form an integrated and detachable structure, which not only reduces the inconvenience of holding a sieve in one hand and a brush in the other hand in order to perform wet sieving, but also facilitates particle size screening and collecting operations.

In addition, the purpose of the present disclosure is to provide an integrated sieve device for particle size screening of soil samples that is very easy to prepare and clean, in addition to efficient sieving operations, by providing an adjustable and detachable structure of the sieve, which allows the sieve to be tilted sufficiently after sieving to collect all of the fractionated sediment on the sieve without loss, while the sieve can be detached and cleaned after the collecting is completed.

In order to achieve the purpose, an aspect of the present disclosure provides an integrated sieve device for particle size screening of a soil sample, the device comprising: a particle size screening unit having at least one sieve and configured to screen the soil sample by particle sizes and to drop the soil sample; a body housing in a cylindrical shape, wherein a part of a lateral surface of the body housing is open, wherein the particle size screening unit is detachably coupled to an inner lateral surface of the body housing in a direction that the part of the lateral surface of the body housing is open; a sample reception unit mounted at a lower portion of the particle size screening unit coupled to the body housing and configured to collect soil and water discharged below the particle size screening unit by being screened by the sieve; and a water supply unit mounted at an inlet formed on an upper end of the body housing and configured to supply water into the particle size screening unit.

In some exemplary embodiments, the particle size screening unit may be formed as a sieve including a ring-shaped frame and a mesh mounted at a bottom portion inside the ring-shaped frame for sieving the soil sample, and at least one of the sieves may be provided to be stacked in a single or multiple layers.

In some exemplary embodiments, a pair of convex portions may be formed on an inside of the lateral surface of the body housing, and a pair of groove portions may be formed on an outside of a lateral surface of the particle size screening unit. In addition, the pair of convex portions may be respectively coupled to the pair of groove portions such that the particle size screening unit is pivotable in a predetermined angle.

In some exemplary embodiments, the sample reception unit may be formed with a material that is transparent or translucent.

In some exemplary embodiments, the water supply unit may include: a water control unit mounted at the inlet and configured to control an intensity, an amount and a dispersion of a stream of the water supplied into the particle size screening unit; and a water container configured to contain water, wherein an entrance of the water container is mounted at an upper end of the water control unit.

In some exemplary embodiments, the water control unit may include: at least two disk-shaped nozzles each having a plurality of through holes of different sizes from one another. In addition, the at least two disk-shaped nozzles may be coupled such that sizes of the through holes are controllable by rotating any one of the at least two disk-shaped nozzles.

In some exemplary embodiments, the body housing may include a pair of convex portions formed on both insides on a horizontal line of the lateral surface that is open, and a pair of groove portions may be formed on both outsides of the particle size screening unit in correspondence to the pair of convex portions, respectively. In addition, the pair of convex portions may be respectively inserted into the pair of groove portions to be pivotably coupled.

In some exemplary embodiments, the particle size screening unit may be formed in a shape of an oval disk of which a major axis is connected to the body housing.

In some exemplary embodiments, a catching groove in a line shape may be formed along an inner circumferential surface of the body housing such that a lower edge of the particle size screening unit may be caught to be coupled to the catching groove when the particle size screening unit rotates.

In some exemplary embodiments, the particle size screening unit may be formed by stacking a plurality of sieves each having a different size from one another, such that a size of mesh hole of each of the plurality of sieves decreases towards a bottom of the stacked sieves.

Specific details of other exemplary embodiments are included in "Details for carrying out the invention" and accompanying "drawings".

Advantages and/or features of the present disclosure, and a method for achieving the advantages and/or features will become obvious with reference to various exemplary embodiments to be described below in detail together with the accompanying drawings.

However, the present disclosure is not limited only to a configuration of each exemplary embodiment disclosed below, but may also be implemented in various different forms. The respective exemplary embodiments disclosed in this specification are provided only to complete disclosure of the present disclosure and to fully provide those skilled in the art to which the present disclosure pertains with the category of the present disclosure, and the present disclosure will be defined only by the scope of each claim of the claims.

According to some exemplary embodiments of the present disclosure, the user can select a proper size of sieve among the sieves with different mesh sizes depending on the user's requirements.

It is also advantageous in that the sieve is formed in a stacked structure with sieves of different mesh sizes, which facilitates the sifting of soil samples by their particle sizes. Such stacked structure can be used versatility for different soil types and requirements from specific particle size.

In addition, according to some exemplary embodiments of the present disclosure, the sieve is directly and easily accessible to the user, allowing visual monitoring and management of the sieving process. Here, the sieve and the beaker-shaped collector can be separated, simplifying the cleaning process, and the parts can be replaced or exchanged according to the requirements of the sieving process.

In addition, according to some exemplary embodiments of the present disclosure, the rotatable sieve design promotes more dynamic sieving, allowing the soil sample to move across the sieve surface, increasing the likelihood for fine particles to pass through the sieve.

In addition, according to some exemplary embodiments of the present disclosure, the inclined structure of the sieves makes it easier for the user to brush, and in particular, such structure can help to remove soil particles and improve the sieving process, especially when working with sticky or clayey soils.

In addition, according to some exemplary embodiments of the present disclosure, as an integrated structure, the wet sieving device is integrated, further simplifying the overall process for sieving, thus eliminating the need to assemble or configure multiple components.

In addition, according to some exemplary embodiments of the present disclosure, the amount and pressure of water supplied to the soil sample can be adjusted to improve the efficiency of wet sieving. In particular, the wet sieving is useful for samples that are prone to agglomerate or for particles that are difficult to sieve under dry conditions.

In addition, according to some exemplary embodiments of the present disclosure, loss of sample can be minimized. That is, by using the beaker-type collectors or sample reception unit, sieved samples can be effectively oriented and collected, reducing the potential for sample loss or spillage.

As mentioned above, the integrated sieve device for particle size screening of a soil sample according to some exemplary embodiments of the present disclosure provides a very useful device for soil analysis and similar applications as it provides a harmonious balance of functionality, efficiency and user-friendliness, simplifies the sieving process, and ensures more consistent results.

BRIEF DESCRIPTION OF THE DRAWINGS

FIG. 1 is an exploded perspective view of an integrated sieve device for particle size screening of a soil sample according to an exemplary embodiment of the present disclosure.

FIG. 2 is a combined perspective view of an integrated sieve device for particle size screening of a soil sample according to an exemplary embodiment of the present disclosure.

FIG. 3 is a diagram illustrating a particle size screening unit in a stack type applied to an integrated sieve device for particle size screening of a soil sample according to an exemplary embodiment of the present disclosure.

FIG. 4 is a diagram illustrating various mesh sizes of a particle size screening unit in a stack type applied to an integrated sieve device for particle size screening of a soil sample according to an exemplary embodiment of the present disclosure.

FIG. 5 is a side view of an integrated sieve device for particle size screening of a soil sample according to an exemplary embodiment of the present disclosure.

DETAILED DESCRIPTION OF THE DISCLOSURE

Before describing the present disclosure in detail, the terms or words used in this specification should not be construed as being unconditionally limited to their ordinary or dictionary meanings, and in order for the inventor of the present disclosure to describe his/her disclosure in the best way, concepts of various terms may be appropriately defined and used, and furthermore, the terms or words should be construed as means and concepts which are consistent with a technical idea of the present disclosure.

That is, the terms used in this specification are only used to describe preferred embodiments of the present disclosure, and are not used for the purpose of specifically limiting the contents of the present disclosure, and it should be noted that the terms are defined by considering various possibilities of the present disclosure.

Further, in this specification, it should be understood that, unless the context clearly indicates otherwise, the expression in the singular may include a plurality of expressions, and similarly, even if it is expressed in plural, it should be understood that the meaning of the singular may be included.

In the case where it is stated throughout this specification that a component "includes" another component, it does not exclude any other component, but may further include any other component unless otherwise indicated.

Furthermore, it should be noted that when it is described that a component "exists in or is connected to" another component, this component may be directly connected or installed in contact with another component, and in inspect to a case where both components are installed spaced apart from each other by a predetermined distance, a third component or means for fixing or connecting the corresponding component to the other component may exist, and the description of the third component or means may be omitted.

On the contrary, when it is described that a component is "directly connected to" or "directly accesses" to another component, it should be understood that the third element or means does not exist.

Similarly, it should be construed that other expressions describing the relationship of the components, that is, expressions such as "between" and "directly between" or "adjacent to" and "directly adjacent to" also have the same purpose.

In addition, it should be noted that if terms such as "one side", "other side", "one side", "other side", "first", "second", etc., are used in this specification, the terms are used to clearly distinguish one component from the other component and a meaning of the corresponding component is not limited used by the terms.

Further, in this specification, if terms related to locations such as "upper", "lower", "left", "right", etc., are used, it should be understood that the terms indicate a relative location in the drawing with respect to the corresponding component and unless an absolute location is specified for their locations, these location-related terms should not be construed as referring to the absolute location.

Further, in this specification, in specifying the reference numerals for each component of each drawing, the same component has the same reference number even if the component is indicated in different drawings, that is, the same reference number indicates the same component throughout the specification.

In the drawings attached to this specification, a size, a location, a coupling relationship, etc. of each component constituting the present disclosure may be described while being partially exaggerated, reduced, or omitted for sufficiently clearly delivering the spirit of the present disclosure, and thus the proportion or scale may not be exact.

Further, hereinafter, in describing the present disclosure, a detailed description of a configuration determined that may unnecessarily obscure the subject matter of the present disclosure, for example, a detailed description of a known technology including the prior art may be omitted.

Hereinafter, exemplary embodiments of the present disclosure will be described in detail with reference to related drawings.

FIG. 1 is an exploded perspective view of an integrated sieve device for particle size screening of a soil sample according to an exemplary embodiment of the present disclosure; FIG. 2 is a combined perspective view of an integrated sieve device for particle size screening of a soil sample according to an exemplary embodiment of the present disclosure; FIG. 3 is a diagram illustrating a particle size screening unit in a stack type applied to an integrated sieve device for particle size screening of a soil sample according to an exemplary embodiment of the present disclosure; FIG. 4 is a diagram illustrating various mesh sizes of a particle size screening unit in a stack type applied to an integrated sieve device for particle size screening of a soil sample according to an exemplary embodiment of the present disclosure; and FIG. 5 is a side view of an integrated sieve device for particle size screening of a soil sample according to an exemplary embodiment of the present disclosure.

As illustrated in FIG. 1 and FIG. 2, the integrated sieve device for particle size screening of a soil sample according to an exemplary embodiment of the present disclosure may include a particle size screening unit 200, a body housing 100, a sample reception unit 300 and a water supply unit 400.

The particle size screening unit 200 may be configured to screen the soil sample by particle sizes and to drop the soil sample. The particle size screening unit 200 may have at least one sieve to screen the inputted soil sample by particle size and to drop the screened soil sample.

In addition, as illustrated in FIG. 1 and FIG. 2, the particle size screening unit 200 may be formed as a sieve including a ring-shaped frame 210 and a mesh 230 mounted at a bottom portion inside the ring-shaped frame 210 for sieving the soil sample.

In addition, as illustrated in FIG. 2 and FIG. 3, the particle size screening unit 200 may be formed with the single sieve as described above. Alternatively, the particle size screening unit 200 may be formed as a structure where a plural number of the sieves are stacked for screening soil samples in various sizes by their particle sizes.

The sieve may have a size of no more than about 8 centimeters in diameter, and may be inserted from a direction where the body housing 100 is open, such that the sample reception unit 300 (collector) is positioned at a lower portion of the particle size screening unit 200.

In addition, as illustrated in FIG. 4, the particle size screening un unit 200 may be formed by stacking a plurality of sieves to form multiple layers. The hole size of mesh 230 of the plurality of sieves may be different to one another. In an exemplary embodiment of the present disclosure, the mesh 230 in the uppermost layer may have the largest holes, where the holes of the meshes 230 may decrease in size as it goes to the lower layers.

This is to ensure that the different sizes of samples contained in the soil sample can be screened in sequence according to the sizes of the mesh holes. In addition, this is to effectively screen the soil sample by their particle sizes using the stacked multiple meshes 230 having predetermined hole sizes.

In addition, as illustrated in FIG. 5, the particle size screening unit 200 may be in a shape of an elliptical disk, where both ends of a major axis of the elliptical disk is connected to the body housing 100. Such structure is to form a gap space between a rear end of the particle size screening unit 200 and an inner surface of the body housing 100, such that the mesh 230 can tilt relative to an axis formed by the both inner surfaces of the body housing 100 where the particle size screening unit 200 is connected.

As illustrated in FIG. 1 and FIG. 2, the body housing 100 may be a housing device, that is cylindrical in shape, open on one side, and detachably coupled to an inner lateral surface of the body housing in a direction that the part of the lateral surface of the body housing 100 is open.

In addition, as illustrated in FIG. 1 and FIG. 2, the body housing 100 may include a pair of convex portions 115 formed on an inside of the lateral surface of the body housing 100, and the particle size screening unit 200 may include a pair of groove portions 215 formed on an outside of a lateral surface of the particle size screening unit 200. The pair of convex portions 115 may be respectively coupled to the pair of groove portions 215 such that the particle size screening unit 200 is pivotable in a predetermined angle.

Alternatively, the body housing 100 may include a pair of groove portions formed on an inside of the lateral surface of the body housing 100, and the particle size screening unit 200 may include a pair of convex portions formed on an outside of a lateral surface of the particle size screening unit 200. The pair of groove portions may be respectively coupled to the pair of convex portions such that the particle size screening unit 200 is pivotable in a predetermined angle.

Moreover, the pivotable coupling structure between the body housing 100 and the particle size screening unit 200 may be formed as a detachable hinge structure.

As described above, by forming a detachable structure in which the particle size screening unit 200 can be inserted from an open side of the body housing 100, it may be provided a screening device in which the sieves having various mesh hole sizes can be conveniently attached and detached to screen soil samples by their particle sizes depending on uses and purposes.

Furthermore, the particle size screening unit 200 may be allowed to tilt at a certain angle by the structure in which the groove portions 215 of the particle size screening unit 200 are pivotably coupled to the convex portions 115 of the body housing 100.

That is, the particle size screening unit 200 may be coupled to the body housing 100 such that the particle size screening unit 200 is tiltable. This is to allow the particle size screening unit 200 to tilt toward the user, such that the user can gently brush the soil samples placed on the sieves to facilitate sieving.

In addition, as illustrated in FIG. 5, a catching groove 135 in a line shape may be formed along an inner circumferential surface of the body housing 100 such that a lower edge of the particle size screening unit 200 may be caught to be coupled to the catching groove 135 when the particle size screening unit 200 rotates.

In particular, the particle size screening unit 200 may include a cylindrical frame 200 in a shape of a ring or an ellipse having a certain thickness and a mesh 230 formed on an inner lateral surface of frame 200. The body housing 100 may have a structure in which a part of a lateral surface of the cylindrical body housing 100 is open. Although the side of the particle size screening unit 200 that is exposed to the open structure is free to rotates, the rotation of the other side of the particle size screening unit 200 may be restricted due to the proximity of the rear inner surface of the body housing 100 and the particle size screening unit 200. Therefore, the particle size screening unit 200 may have an elliptical shape elongated in the direction of the rotation axis in order to form a spacing gap to enable rotation of the particle size screening unit 200 at a certain angle.

Furthermore, as illustrated in FIG. 5, the particle size screening unit 200 may be tilt and be fixed in order for the user to conveniently brush the soil sample placed on the mesh 230 with a brush. To this end, a catching groove 135 in a line shape may be formed along an inner circumferential surface of the body housing 100. When the particle size screening unit 200 rotates, the rear lower edge of the particle size screening unit 200 may contact a portion of the rear inner surface of the body housing 100. The catching groove 135 may be formed in this contact line such the rear lower edge of the particle size screening unit 200 may be fixedly secured by being caught or being snapped into the catching groove 135.

Here, the retention force by which the lower edge of the particle size screening unit 200 is caught in the catching groove 135 may be to the extent that the user can easily disengage the disengage the fixation by applying a certain amount of force, while retaining sufficient retention force to reliably perform sieving through the brush.

That is, as illustrated in FIG. 5, a catching groove 135 in a line shape may be formed above the convex portions 115 along an inner circumferential surface of the body housing 100 such that a lower edge of the particle size screening unit 100 is caught to be coupled to the catching groove 135 when the particle size screening unit 200 rotates.

Here, the spacing distance between the rear surface of the particle size screening unit 200 and the inner surface of the body housing 100 may determine a rotatable angle of the particle size screening unit 200 and a position of the catching groove 135 in a line shape as described above.

In addition, as illustrated in FIG. 1 and FIG. 2, the sample reception unit 300 may be a device mounted at a lower portion of the particle size screening unit 200. The sample reception unit 300 may be configured to collect soil and water discharged below the particle size screening unit 200 by being screened by the sieve.

In an exemplary embodiment of the present disclosure, the sample reception unit 300 may be formed with a material that is transparent or translucent. Moreover, the sample reception unit 300 may be formed in a shape of a beaker. Such structure of the sample reception unit 300 is advantageous in that the transparent or translucent material enables to facilitate viewing of water and soil samples dropped from the particle size screening unit 200 and the sample reception unit 300 can be easily inserted into the open side of the body housing 100. Therefore, collecting of the sample may be performed simultaneously along with sieving of the soil sample.

In addition, as illustrated in FIG. 1 and FIG. 2, the water supply unit 400 may be a device mounted at an inlet formed on an upper end of the body housing 100 and configured to supply water into the particle size screening unit 200. The water supply unit 400 may store the water to be supplied to the particle size screening unit 200 for sieving and screening soil samples.

Further, the water supply unit 400 may include a water control unit 410 mounted at the inlet of the body housing 100. The water control unit 410 may be configured to control an intensity, an amount and a dispersion of a stream of the water supplied into the particle size screening unit 200. The water supply unit 400 may also include a water container 420 configured to contain water. Here, an entrance of the water container 420 may be mounted at an upper end of the water control unit 410.

That is, the water control unit 410 may be mounted at the inlet formed in the top center of the body housing 100, and the water container 420 in a shape of a bottle may be mounted at the water control portion 410 in a shape of a small tube.

Here, although it is not illustrated in the figures, the water control unit 410 may have a structure of a shower head including at least two disk-shaped nozzles each having a plurality of through holes of different sizes from one another. The at least two disk-shaped nozzles may be coupled such that sizes of the plurality of through holes can be controlled by rotating any one of the at least two disk-shaped nozzles.

In other words, the water control unit 410 may be a shower head structure in which two or more disk-shaped nozzles having different sizes of water through holes are combined to allow the size of the water through holes to be adjusted by rotating any one of the nozzles.

As described above, the nozzle structure having different sizes and different arrangements of the through holes stacked in a vertical direction has the advantage that when one of the nozzles is rotated, the size of the through holes formed by the common through holes of each nozzle varies as the two nozzles are staggered with each other, such that the opening and closing function of the water supply unit 400 can be performed, as well as the water injection pressure can be adjusted by controlling the size of the holes through which the water passes.

Therefore, the integrated sieve device for particle size screening of a soil sample according to an exemplary embodiment of the present disclosure has the following advantages and effects 1) Easy to operate: The sieve is directly and easily accessible to the user, allowing the user to visually monitor and manage the sieving process; the sieve and beaker-shaped collector can be separated, which simplifies the cleaning process, and has the advantages of replacing or exchanging parts according to the requirements of the sieving process.
2) Improved sieving efficiency: The rotatable sieve design promotes more dynamic sieving, allowing the soil sample to move across the sieve surface, increasing the likelihood of fine particles passing through.

In addition, the inclined structure of the sieves makes it easier for the user to brush, which can help remove soil particles and improve the sieving process, especially when dealing with sticky or clayey soils.

3) Optimized for wet sieving: As a one-piece construction, the integrated wet sieving unit further simplifies the entire process and eliminates the need to assemble or configure multiple components.
4) Control of water supply: The integrated sieve device for particle size screening of a soil sample according to an exemplary embodiment of the present disclosure can improve the efficiency of wet sieving by being able to control the amount and pressure of water supply to the soil sample.

Furthermore, wet sieving is particularly useful for samples that are prone to agglomeration or for particles that are difficult to sieve under dry conditions.

5) Minimizing sample loss: By using a beaker-type collector or sample reception unit 300, the sieved sample can be effectively oriented and collected, reducing the potential for sample loss or spillage.
6) Screening by particle sizes and versatility: Users can select the appropriate sieve from a plurality of sieves with different mesh sizes depending on the user's requirements. In addition, a stacked structure with a plurality of sieves of different mesh sizes can be formed, which facilitates particle size screening of soil samples. This makes it versatile for different soil types and specific particle size requirements.

As described above, the integrated sieve device for particle size screening of a soil sample according to an exemplary embodiment of the present disclosure a harmonious balance of functionality, efficiency, and user-friendliness, and can streamline the sieving process to ensure more consistent results, thus providing an extremely useful device for soil analysis and similar applications.

In the above, although several preferred embodiments of the present disclosure have been described with some examples, the descriptions of various exemplary embodiments described in the "Specific Content for Carrying Out the Invention" item are merely exemplary, and it will be appreciated by those skilled in the art that the present disclosure can be variously modified and carried out or equivalent executions to the present disclosure can be performed from the above description.

In addition, since the present disclosure can be implemented in various other forms, the present disclosure is not limited by the above description, and the above description is for the purpose of completing the disclosure of the present disclosure, and the above description is just provided to completely inform those skilled in the art of the scope of the present disclosure, and it should be known that the present disclosure is only defined by each of the claims.

LIST OF REFERENCE NUMBERS

100: body housing
115: convex portion
135: catching groove
200: particle size screening unit
210: ring-shaped frame
215: groove portion
230: mesh
300: sample reception unit
400: water supply unit
410: water control unit
420: water container

What is claimed is:
1. An integrated sieve device for particle size screening of a soil sample, the integrated sieve device comprising:

a particle size screening unit having at least one sieve and configured to screen the soil sample by particle sizes and to drop the soil sample;

a body housing in a cylindrical shape, wherein a part of a lateral surface of the body housing is open, wherein the particle size screening unit is detachably coupled to an inner lateral surface of the body housing in a direction that the part of the lateral surface of the body housing is open, wherein a pair of convex portions are formed on an inside of the lateral surface of the body housing, wherein a pair of groove portions are formed on an outside of a lateral surface of the particle size screening unit, and wherein the pair of convex portions are respectively coupled to the pair of groove portions such that the particle size screening unit is pivotable in a predetermined angle;

a sample reception unit mounted at a lower portion of the particle size screening unit coupled to the body housing and configured to collect soil and water discharged below the particle size screening unit by being screened by the sieve; and a water supply unit mounted at an inlet formed on an upper end of the body housing and configured to supply water into the particle size screening unit.

2. The integrated sieve device of claim 1,
wherein the particle size screening unit is formed as a sieve including a ring-shaped frame and a mesh mounted at a bottom portion inside the ring-shaped frame for sieving the soil sample, and
wherein at least one of a plurality of sieves are provided to be stacked in a single or multiple layers.

3. The integrated sieve device of claim 1,
wherein the sample reception unit is formed with a material that is transparent or translucent.

4. The integrated sieve device of claim 1, wherein the water supply unit includes:

a water control unit mounted at the inlet and configured to control an intensity, an amount and a dispersion of a stream of the water supplied into the particle size screening unit; and a water container configured to contain water, wherein an entrance of the water container is mounted at an upper end of the water control unit.

5. The integrated sieve device of claim 4, wherein the water control unit includes:
at least two disk-shaped nozzles each having a plurality of through holes of different sizes from one another, wherein the at least two disk-shaped nozzles are coupled such that sizes of the through holes are controllable by rotating any one of the at least two disk-shaped nozzles.

6. The integrated sieve device of claim 1, wherein
the body housing includes the pair of convex portions formed on both insides on a horizontal line of the lateral surface that is open,
the pair of groove portions are formed on both outsides of the particle size screening unit in correspondence to the pair of convex portions, respectively, and
the pair of convex portions are respectively inserted into the pair of groove portions to be pivotably coupled.

7. The integrated sieve device of claim 6,
wherein the particle size screening unit is formed in a shape of an oval disk of which a major axis is connected to the body housing.

8. The integrated sieve device of claim 6,
wherein a catching groove in a line shape is formed along an inner circumferential surface of the body housing such that a lower edge of the particle size screening unit is caught to be coupled to the catching groove when the particle size screening unit rotates.

9. The integrated sieve device of claim 1,
wherein the particle size screening unit is formed by stacking a plurality of sieves each having a different size from one another, such that a size of mesh hole of each of the plurality of sieves decreases towards a bottom of the stacked plurality of sieves.

* * * * *